United States Patent
Alves

(10) Patent No.: US 10,462,427 B2
(45) Date of Patent: Oct. 29, 2019

(54) SECURING REMOTE VIDEO TRANSMISSION FOR THE REMOTE CONTROL OF A VEHICLE

(75) Inventor: Clara Nogueira Alves, Issy les Moulineaux (FR)

(73) Assignee: Siemens Mobility SAS, Chatillon (FR)

( * ) Notice: Subject to any disclaimer, the term of this patent is extended or adjusted under 35 U.S.C. 154(b) by 992 days.

(21) Appl. No.: 13/698,778

(22) PCT Filed: Jun. 30, 2010

(86) PCT No.: PCT/EP2010/059275
§ 371 (c)(1),
(2), (4) Date: Dec. 27, 2012

(87) PCT Pub. No.: WO2011/144261
PCT Pub. Date: Nov. 24, 2011

(65) Prior Publication Data
US 2013/0222591 A1    Aug. 29, 2013

(30) Foreign Application Priority Data
May 19, 2010    (EP) ..................................... 10290263

(51) Int. Cl.
*H04N 7/08*    (2006.01)
*B61L 23/00*    (2006.01)
(Continued)

(52) U.S. Cl.
CPC .............. *H04N 7/185* (2013.01); *B61L 3/127* (2013.01); *B61L 23/00* (2013.01); *B61L 23/041* (2013.01); *B61L 27/04* (2013.01); *H04N 7/08* (2013.01)

(58) Field of Classification Search
CPC ........ H04N 7/185; H04N 7/181; G07C 5/085; B61L 27/04
(Continued)

(56) References Cited

U.S. PATENT DOCUMENTS 3,703,640 A * 11/1972 Broussaud et al. ............. 398/79
5,550,756 A *  8/1996 Ohmi et al. ................... 709/247
(Continued)

FOREIGN PATENT DOCUMENTS

CN    1652604 A    8/2005
DE    43 39 075 A1    5/1995
(Continued)

OTHER PUBLICATIONS

Javidi: "Securing Information with Optical Technologies", Physics Today, American Institute of Physics, New York, US, vol. 50, No. 3, pp. 27-32; 1997; US; Mar. 1, 1997.

*Primary Examiner* — Thai Q Tran
*Assistant Examiner* — Jose M Mesa
(74) *Attorney, Agent, or Firm* — Laurence Greenberg; Werner Stemer; Ralph Locher

(57) ABSTRACT

A method and system secure remote video transmissions for the remote control of a vehicle. The system secures the remote transmission of an image via a photosensitive receiver of a camera capable of remotely displaying the image. The system contains an optical securing information generator capable of generating optical securing information and an optical module capable of optically superimposing a securing image including the optical securing information and the image of the object to form a secured optical image for acting on the photosensitive receiver capable of generating a video signal. The system couples a device for remotely receiving the video signal from the video system to a device for processing the video signal. The video signal processing device is capable of detecting, reading and extracting optical securing information in the video signal of the secured optical image. The system has a display device for displaying the optical securing information.

15 Claims, 2 Drawing Sheets

(51) Int. Cl.
*B61L 27/04* (2006.01)
*H04N 7/18* (2006.01)
*B61L 23/04* (2006.01)
*B61L 3/12* (2006.01)

(58) Field of Classification Search
USPC .......................................................... 348/148
See application file for complete search history.

(56) References Cited

U.S. PATENT DOCUMENTS

| | | |
|---|---|---|
| 6,211,907 B1 * | 4/2001 | Scaman et al. ............... 348/148 |
| 6,624,874 B2 | 9/2003 | Revelli, Jr. et al. |
| 6,750,902 B1 | 6/2004 | Steinberg et al. |
| 7,289,655 B2 * | 10/2007 | Kitabayashi ......... G01N 21/958 |
| | | 348/92 |
| 7,508,941 B1 | 3/2009 | O'Toole, Jr. et al. |
| 7,831,049 B1 * | 11/2010 | Kanter .......................... 380/256 |
| 2002/0150242 A1 * | 10/2002 | Javidi et al. .................... 380/54 |
| 2008/0048887 A1 * | 2/2008 | Aoki ..................... G01S 7/4802 |
| | | 340/937 |
| 2008/0100821 A1 | 5/2008 | Yabe |
| 2009/0002491 A1 * | 1/2009 | Haler ............................. 348/148 |
| 2009/0043531 A1 | 2/2009 | Kahn et al. |
| 2009/0066790 A1 | 3/2009 | Hammadou |

FOREIGN PATENT DOCUMENTS

| | | |
|---|---|---|
| DE | 10128728 A1 | 1/2003 |
| EP | 1 326 423 A1 | 7/2003 |
| JP | 2003262833 A | 9/2003 |
| TW | 200940954 A | 10/2009 |
| TW | I319169 B | 1/2010 |
| TW | 201009307 A | 3/2010 |

\* cited by examiner

SECURING REMOTE VIDEO TRANSMISSION FOR THE REMOTE CONTROL OF A VEHICLE

BACKGROUND OF THE INVENTION

Field of the Invention

The present invention relates to a method and a system for securing a remote transmission of an image intended to be captured by a photosensitive receiver of a video system, according to the preambles of the claims.

In particular, the present invention relates to the domain of guided vehicles requiring remote control by means of at least one on-board camera including said photosensitive receiver, said remote control being necessarily characterized by a high level of operational security.

"Guided vehicle" refers to public transport means such as buses, trolleybuses, streetcars, subways, trains or train units, etc., as well as load transporting means such as, for example, overhead travelling cranes, for which safety is a very important factor. In particular, the invention relates to the railway domain, in particular to transport means fitted with a control system based on remote communication, for example trains fitted with a radio train control system, commonly referred to as "communication-based train control" (CBTC).

It is known to the person skilled in the art that images of an object taken by a camera can be sent remotely so that they can be viewed in real time at a site physically removed from said object. Thus, a camera on board a vehicle is able to film an object, for example a scene inside or outside the vehicle, and to cooperate with a video-image transmission device able to send a video signal of the object filmed from the vehicle to a receiver device on the ground that is able to receive said video signal, and to cooperate with a display device in order to display said film object on the basis of said video signal received. Images can therefore be taken by said on-board camera so that they can be viewed remotely by an operator using said display device.

Such a video system including the camera that can be carried on board, the transmission device, the receiver device and the display device can in particular enable the vehicle to be driven or controlled remotely by an operator, said driving or control being based in particular on said operator viewing the video images in real time. Such a remote control or command function based on the display, for example on a screen of a display device, of the image captured by a camera carried on board the remotely controlled or commanded vehicle is in particular described in published patent applications U.S. 2009/0248220 A1 and WO 2009/087543 A2, as well as U.S. Pat. No. 6,803,854 B1.

The image of an object captured by a photosensitive receiver and the remote display thereof, i.e. said image of said object displayed remotely, may be different. Indeed, video-system malfunctions may result in the image displayed not matching the image of the object as filmed and captured by the photosensitive receiver of a camera. Indeed, numerous sources of errors could modify the content and/or sequencing of the images captured and processed by the video system. For example, errors may come from the camera, the transmission device, the receiver device, or the display device. Thus, said errors may occur at different levels, for example during processing of a video image, during transmission of a video signal corresponding to said image or during the display thereof, thereby altering the image displayed.

Moreover, different operations on the images of a video film may cause disturbances of varying degrees of significance in the display and therefore viewing thereof. These operations may be required for image-processing reasons (such as compression, filtering, encoding, sampling, etc.) or they may be malicious actions. A malicious action may for example involve recovering the content of the image or modifying it with the intention of causing harm.

Furthermore, errors or defects observed on an image sent digitally may stem from the compression parameters used by a video encoder required to digitalize the image. Another source of disturbances is the video-signal transmission network, the transmission time of which is difficult to control. For example, the jitter (variation in transmission time) may result in the replication or removal of a part of the video signal in the spatial or temporal domain. This results in a repetition or a removal of images, or in a loss or an addition of lines or columns in a specific image of the video film.

Furthermore, the video systems currently enabling a remote display of video images taken by a camera that can be carried on board a vehicle depend on complex electronic systems that incorporate multiple components each of which is a potential source of errors or malfunctions resulting in a remotely displayed image that is different from the image captured by the photosensitive receiver, since each of the images (i.e. image as captured and image as visualized) is assumed to represent the same object.

The aforementioned sources of errors and malfunctions mean that it is often difficult or even impossible to control the reliability and security of video systems over time and in different operating modes. These video systems interact with equipment that sometimes requires a high level of operating security, in particular when a failure could have serious consequences. Indeed, an operating failure of a video system, for example one enabling a guided vehicle to be driven remotely using a real-time display of images taken by a camera on board the guided vehicle, could cause an accident involving said guided vehicle, and have serious consequences, for example for the passengers being transported.

When an operator is remotely controlling a vehicle using the display of images provided by a video system intended for the remote control of said vehicle, there is a risk that said operator will not notice a failure in said image, or that the display of said image is significantly delayed in relation to the capture of the image by the camera that can be carried on board said vehicle. If there is an obstacle on the running track of said vehicle, it must be quickly detected by said operator to enable application of the brake to be commanded remotely, for example. Otherwise, an impact with the obstacle would be inevitable.

Thus, the safe and reliable remote control of a vehicle using a video system can only be achieved if the images received at a remote control station are safe in terms of operational security. In other words, it must be possible to secure the transmission of an image of an object intended firstly to be captured by a photosensitive receiver that can be carried on board the vehicle to be remotely controlled, and secondly to be used to remotely control said vehicle. In other words, it is necessary to guarantee that a video image of said object viewed by a remote operator of said image corresponds in real-time to the image of said object captured by said photosensitive receiver.

BRIEF SUMMARY OF THE INVENTION

One objective of the present invention is to propose a method and a system that are simple, safe and reliable for securing a remote transmission by a video system of an image of an object intended to be captured by a photosensitive receiver of said video system, said securing system and method being adaptable to all types of video system, and able to guarantee the security of said video system, in particular being able to secure the real-time correspondence of the image of said object displayed remotely and the image of said object captured by the photosensitive receiver of a camera of the video system that can be carried on board.

Another objective of the present invention is in particular to warn an operator located remotely from said object of any of the aforementioned malfunctions and sources of errors.

Correspondence between the image of an object displayed remotely and the image of said object filmed by the photosensitive receiver of the camera refers in particular to the conformity of the image viewed (or displayed) remotely at a time $t_2=t+\Delta t$ and representing said object at time t, with the image of said object taken by the photosensitive receiver at time $t_1=t$ and representing said object at time t. In other words, the present invention must make it possible to determine whether the image of an object taken by the photosensitive receiver at time $t_1$ is identical, at the same magnification, to the image of the same object displayed remotely at time $t_2$ and intended to enable, for example, the remote control of a vehicle by an operator. Thus, an image of a remotely displayable object shall be deemed to be identical to an image of said object intended to be captured by a photosensitive receiver if each of the two images represents the same object, i.e. the object at time t, and if the delay $\Delta t$ does not exceed a predetermined limit, for example 0.5 seconds.

For this purpose, a method, devices and a system are proposed by the content of the claims. A set of sub-claims also sets out the advantages of the invention.

The present invention proposes a method for securing, in particular in real time, a remote transmission of an image of an object intended to be captured by a photosensitive receiver of a camera of a video system and transmitted remotely by said video system to be displayed remotely, said method being characterized by the following steps:

Generation of an optical securing datum of the remote transmission of said image of said object, in particular generation by radiation, for example coherent or incoherent, by emission or scattering, of said optical securing datum intended to form a securing image;

A formation of a secure optical image of said object by optical superposition of the securing image comprising said optical securing datum and said image of said object. Said superposition can then appear in said secure optical image, which is intended to act upon the photosensitive receiver of the camera to be converted into a video signal. Said securing image is in particular a real or virtual optical image of said optical securing datum, for example radiated by an optical securing data generator able to perform said generation;

A verification, remotely from said object, of the optical securing datum carried by said video signal relating to the optical superposition of the securing image and of the image of said object.

The method according to the invention can therefore be used to secure the remote transmission of said image of said object by said video system. It proposes optically inserting at least one optical securing datum in the image of said object (i.e. in a real or virtual optical image), intended to be used to remotely control a vehicle, in order to create said secure optical image of said object. The secure optical image, intended to be captured by the photosensitive receiver of the camera, is in this case the optical superposition of the securing image of the optical securing datum and of the image of said object and can be converted, by the photosensitive receiver, into an electrical video signal intended to carry all of the data relating to said secure optical image, for example to remotely display a secure video image including said optical securing datum and/or representing said secure optical image and/or said image of said object. Said secure video image is therefore a video image of said secure optical image, reproducible using said electrical video signal coming from the photoreceiver. Once the optical securing datum has been inserted in said image of said object, a video system used to remotely control a vehicle can in particular enable a remote display of said secure optical image including at least one securing datum. Indeed, once the secure optical image has been captured by the photosensitive receiver and said video signal comprising all of the data relative to said secure optical image has been generated, a step involving the transmission of said electrical video signal of the secure optical image and a step involving the receipt, remotely from said photosensitive receiver, of said video signal in particular enable the video signal from the photosensitive receiver to be routed to a device for displaying the secure optical image that is located remotely from said photosensitive receiver. These transmission and reception steps, as well as the step involving the capture of the secure optical image and display using the display device, may be performed by an existing video system and used for the remote control of said vehicle. The present invention proposes in particular securing the transmission of the image of said object by said video system.

The present invention also proposes a device for securing, in particular in real time, a remote transmission of an image of an object intended to be taken by a photosensitive receiver of a camera of a video system that can enable a transmission and a remote display of said image of said object, said securing device being in particular adapted to said video system, and characterized in that it includes:

An optical securing data generator able to generate, in particular by radiation, for example coherent or incoherent radiation, by optical emission or scattering, an optical securing datum intended to form a securing image, said generator also being couplable to an optical module. In particular, the generator is a source of radiation able to emit or scatter radiation comprising said optical securing datum used to secure the transmission of the image of said object;

said optical module able to optically superpose said securing image including said optical securing datum, and said image of said object, in order to form, on the basis of the superposition of said image of said object and said securing image, a secure optical image of said object intended to act upon the photosensitive receiver.

The present invention also proposes a device for detecting, in particular in real time, an optical securing datum of a secure optical image of an object that can be taken by a photosensitive receiver of a camera of a video system and that is intended to be sent and displayed remotely using said video system, said secure optical image being a superposition of a securing image and an image of said object intended to act on the photosensitive receiver, said detection device being in particular adapted to said video system, and characterized in that it includes:

Coupling means able to couple the means for processing a video signal to a device for remotely receiving said video signal to transmit said video signal of said receiver device of said video system to said processing means of said detection device, said receiver device being in particular designed to remotely receive from said object said video signal of said secure optical image;

Said means for processing the video signal, that are able to detect, read and extract said optical securing datum included in the video signal of said secure optical image, resulting from a superposition of a securing image including said optical securing datum and of an optical image of said object;

Means for displaying said optical securing datum, that are in particular able to cooperate with a display device of the video system.

The present invention also proposes a system for securing, in particular in real time, a remote transmission of an image of an object intended to be captured by a photosensitive receiver of a camera of a video system, said securing system including said securing device and said detection device, said securing and detection devices being intended to cooperate with one another in order to enable the securing of the transmission of the image of said object by means of said video system. The securing device and the detection device are therefore able to cooperate with the video system, including for example a camera that can be carried on board, a transmission device, a receiver device and a display device, in order to secure the transmission of the image of said object taken by said camera and to guarantee the conformity of the image of said object taken by the photosensitive receiver of the camera with the image of said object displayed remotely and in real time by the display device.

The method according to the invention therefore makes it possible to add an optical securing datum between an object filmed by the camera and the photosensitive receiver or sensor of said camera, by superposing said securing image onto said (optical) image of said object that can be captured by the photosensitive receiver of the camera, in order to form said secure optical image of said object. The securing image may be generated by radiation, for example by light emission or light scattering. The optical data generator may for example include a spatial light modulator (SLM) that can radiate said optical securing datum intended to secure the transmission of the image of said object.

In particular, the optical securing datum may include a datum identifying the camera, or more specifically a datum identifying the photosensitive receiver of the camera, and/or a date stamp making it possible to optically date the capturing of an image of said object by the photosensitive receiver. Notably, the optical securing data generator includes a device for identifying the photosensitive receiver of the camera that is able to provide said camera identification datum. For example, said identification device makes it possible to optically mark said camera identification datum on the securing image, said optical marking making it possible to differentiate an image taken by a camera from another image taken by another camera. Said identification device is for example an optical mask having a geometric feature that enables identification of the photosensitive receiver of the camera. In particular, said optical mask is able to cooperate with said SLM of the secure optical data generator in order to form a securing image including said identification datum of the photosensitive receiver. In other words, said identification datum makes it possible to differentiate a capture by a photosensitive receiver of an optical image of said object superposed on a securing image, from another capture by another photosensitive receiver of another optical image of another object superposed on another securing image. In particular, the identification of the photosensitive receiver of the camera uses known physical properties of the video system relating to the behavior thereof in the event of a fault in order to guarantee the intrinsic safety of said video system. For example, the marking of said identification datum according to the present invention is based on the principle of said intrinsic safety of a guided vehicle in that the consequences of a failure or of a shift in the features of said marking, such as a total or partial obstruction of the photosensitive receiver of said camera, an electrical fault or mechanical damage can only result in an untimely stopping of said guided vehicle and not the reverse.

In particular, at least a part of the secure optical image can advantageously include an overlaying of the optical securing datum. Indeed, at least a part of the securing image is intended to enable said overlaying of data relating to the optical securing datum. In particular, the identification of the camera by means of said identification datum, and/or the dating can be overlaid on some or all of the plane of the secure optical image. Said overlaying can therefore be captured by at least a part of the photosensitive receiver of the camera. In particular, the securing image and the image of said object are the same size on the photosensitive receiver, such that said overlaying can cover the entire surface area of the photosensitive receiver of the camera, and therefore the entire secure optical image. The distribution of the spatial marking over all of the securing image advantageously makes it possible to detect a loss of integrity in the image of said object captured by the photosensitive receiver if said securing image is the same size as the image of said object when they are superposed.

Said method according to the invention is in particular able to guarantee the conformity of an image of an object taken by a photosensitive receiver of the camera of a video system, the display thereof being used to view said object remotely. The optical securing data generator is in fact able to generate an optical securing datum by radiation, said datum enabling determination of said conformity when reading said video signal of the secure optical image. In particular, said data generator can be coupled to the optical module in order to superpose said securing image generated by an interaction of said radiation with the optical elements of said optical module or of said generator, on an image of said object capturable by the photosensitive receiver. The optical module enables the superposition of the securing image and of the image of said object before the photosensitive receiver, or on the photosensitive receiver of the camera.

Said optical module is in particular able to form, on the photosensitive receiver, said secure optical image corresponding to the optical superposition of the securing image and of the image of said object. The photosensitive receiver of the camera is then able to convert the secure optical image into a video signal that can reproduce a secure video image representing said secure optical image.

A video system, in particular a conventional video system including said camera, a transmission device enabling a transmission of said video signal, a receiver device enabling a remote receipt of said video signal and the processing thereof, and a display device enabling a display of the video image carried by said video signal enables the video signal of the secure optical image from the camera to be routed to said display device, which is located remotely from said object or from said photosensitive receiver.

The device for detecting the optical securing datum intended to secure the remote transmission by the video system of the image of said object is in particular intended to cooperate with said video system in order to detect and to read the optical securing datum carried by the video signal of the secure optical image. Said detection device can in particular be coupled, using at least one coupling means, to said remote receiver device of said video system in order to receive said video signal of the secure optical image. It may also include said means for processing the optical securing datum that can detect an optical securing datum carried by the video signal of the secure optical image, and to read and extract said optical securing datum. Furthermore, said processing means are in particular able to separate a part of the video signal comprising the data relating to said securing image, and therefore said optical securing datum, from another part of the video signal comprising other data relating to the (optical) image of said object. Advantageously, this separation makes it possible to display said data relating to the securing image separately from said other data relating to the (optical) image of said object to enable a separate display of said image of said object and said optical securing datum.

Furthermore, the means for processing the optical securing datum are in particular able to analyze the optical securing datum to determine whether the image of said object remotely displayable by the display device of the video system using the video signal of said secure optical image matches the image of said object captured by the photosensitive receiver. Furthermore, said processing means are in particular able to flag, in particular visually and/or audibly, a failure in the remote transmission of data relating to the image of said object, for example a discrepancy in the conformity of the image of said object reproducible remotely from said video signal of the secure optical image following separation of said related data and said other related data, with the (optical) image of said object intended to be captured by said photosensitive receiver.

Finally, the means for displaying said optical securing datum are in particular able to cooperate with said display device of the video system in order to enable for example said image of said object and/or said optical securing datum to be displayed on a single screen. Thus, the detection device enables a display, remotely from the camera, of the optical securing datum and of the image of said object, with in particular a display of a verification of the origin and of the recentness of the optical securing datum, as well as the integrity of the image of said object. In particular, said processing means are able to determine the delay $\Delta t$ between the time the image of said object is captured and the time the image of said object is displayed remotely. If this delay $\Delta$ exceeds a predetermined limit value, the processing means according to the invention are in particular able to flag the exceedance.

Advantageously, the securing device according to the invention enables the superposition of two optical images at the input of the camera, i.e. the image of said object as normally filmed by the camera and said securing image. The image of said object is for example an optical image of a scene that can be filmed by the camera and is intended to be viewed remotely by an operator using said display device of the video system. The securing image includes said optical securing datum, which is used to determine the conformity of the image of said remotely displayable object by means of the display device with the image of said object capturable by the photosensitive receiver of the camera.

Thus, the securing device according to the invention is able to insert said optical securing datum in the video images capturable by a camera before said video images are modified or manipulated electronically. Indeed, the optical securing datum is inserted optically into the (optical) image of said object before it is captured by the camera. Advantageously, as the insertion of the optical securing datum is done optically before the image captured by the photosensitive receiver is converted into a video signal, it follows that said insertion of the optical securing datum is independent of the operation and type of video system. The securing device according to the invention is therefore advantageously adaptable to any type of video system, regardless of the features or operation thereof. In particular, said securing device can be attached in front of, or directly to the camera in order to form said secure optical image on the photosensitive receiver of the camera.

Moreover, the optical data generator can generate an optical securing datum that varies in time and/or space. The temporal variation of the optical securing datum is for example intended to timestamp the securing image, for example by means of said dating, such that each securing image superposable on said image of said object includes a different timestamp (for example, a different date), while the spatial variation of the optical securing datum is for example intended to spatially mark the securing image, in particular by overlaying a camera identification datum, or a spatial identifier of the camera, in particular over all of the securing image.

Thus, each secure optical image can be formed through the optical superposition of said image of said object and of said securing image, and therefore to include in particular a securing datum relating to the aforementioned temporal and/or spatial marking, such that, for example, each secure optical image includes a date and an identification, by means of said spatial identifier, of the camera incorporating said photosensitive receiver.

For this purpose, the securing device and the detection device according to the invention may in particular each include a clock. The clock of the detection device and the clock of the securing device can in particular be synchronized with one another in order to enable precise temporal control of the video system by comparison of the date indicated by the clock of the detection device with the date extracted, using said processing means, from the optical securing datum of the video signal of the secure optical image. The comparison of said dates in particular makes it possible to determine whether the delay $\Delta t$ exceeds said predetermined limit value.

Advantageously, the spatial identifier of the camera is in particular an inalterable optical securing datum in that it is able to ensure safety integrity level (SIL) 4 regarding the probability of confusing two cameras. Safety integrity level (SIL) 4 is defined by IEC standard 61508 on the safety of critical systems, and it requires a probability of dangerous failure per hour of between $10^{-8}$ and $10^{-9}$. The spatial marking using said spatial identifier makes it possible to mark the image of said object capturable by each photosensitive receiver of each camera with an identification datum belonging to each photosensitive receiver, in other words with a spatial identifier specific to each photosensitive receiver, such that each image of said object viewable remotely using said display device can be associated with only one photosensitive receiver with safety integrity level (SIL) 4. For this purpose, the optical securing data processing means are able to classify several video signals from different secure optical images as a function of said spatial identifier of the camera.

The present invention can be better understood through the example embodiments and applications provided using the figures below.

DESCRIPTION OF THE INVENTION

Figure 1:
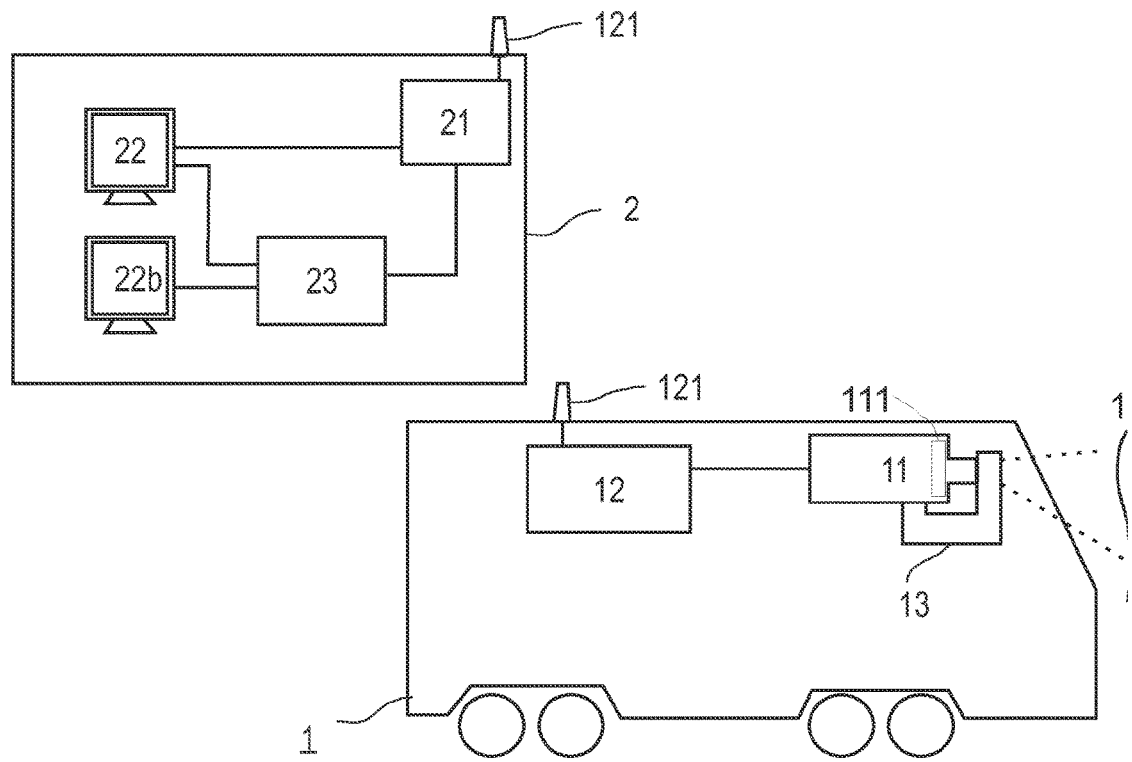
FIG. 1 Example embodiment according to the invention of a system for securing a transmission of a video image.

By way of example, FIG. 1 shows a securing system designed to secure a remote transmission by a video system of an (optical) image of an object 14, said image of said object 14 being in particular intended to act on a photosensitive receiver 111 of said video system, and to be used for example to remotely control a vehicle.

1. Said video system comprises in particular:
   A camera 11, including said photosensitive receiver 111, which can be carried on board said vehicle 1 or remotely located in relation to a control station 2, said photosensitive receiver 111 being able to convert light radiation into a video signal;
   a transmission device 12 able to transmit said video signal from said photoreceiver to a receiver device 21. Said transmission device 12 can also be carried on-board said vehicle 1 or located remotely from said control station 2, and can be coupled to said camera 11 in order to transmit said video signal, for example by means of an antenna 121 that can be fitted to said transmission device and is used for the remote transmission of said video signal;
   Said receiver device 21 can receive and process said video signal. Said receiver device 21 is in particular intended to be fitted to said remote control station 2 and to cooperate with a display device 22 to enable said image of said object taken by said camera and reproducible on the basis of said video signal to be displayed. Said receiver device 21 may in particular include an antenna 121 to receive the transmission of said video signal by said transmission device 12;
   Said display device 22, which can be coupled to said receiver device 21 and is intended to display, for example on a screen, the image of said object carried by said video signal.

In other words, said video system is a system for remotely viewing at least one image taken by said photosensitive receiver 111, said image being intended for example to enable an operator, located at the control station 2, to remotely control said vehicle 1 by viewing the real-time display of said image of said object. Said securing system according to the invention is in particular intended to be coupled and to cooperate with such a video system so as to guarantee a match between the image of said object taken by the photosensitive receiver 111, and said image of said object displayable in real-time remotely using said display device 22.

Said securing system according to the invention includes in particular a device 13 for securing the remote transmission of the image of said object 14 and a device 23 for detecting an optical securing datum of a secure optical image of said object 14. The securing device 13 and the detection device 23 cooperate firstly with one another, and secondly with said video system to which they can each be coupled using coupling means, in order to guarantee said match between the image of said object capturable by the photosensitive receiver 111 of the camera 11, and the image of said object displayable and viewable remotely in real-time using said display device 22 of said video system. On one hand, the securing device is able to secure said image of said object by creating said secure optical image of said object by means of the optical incorporation into the image of said object of an optical securing datum, said secure optical image being a secure image of said object, and on the other hand, the detection device is able to detect the securing of said secure optical image in order to determine whether the image of said object capturable by the photosensitive receiver matches the image of said remotely displayable object. In particular, the method, the securing system, and the securing and detection device according to the invention are particularly intended to secure a transmission of an image of said object by a video system used to remotely control a vehicle, in particular a guided vehicle.

Figure 2:
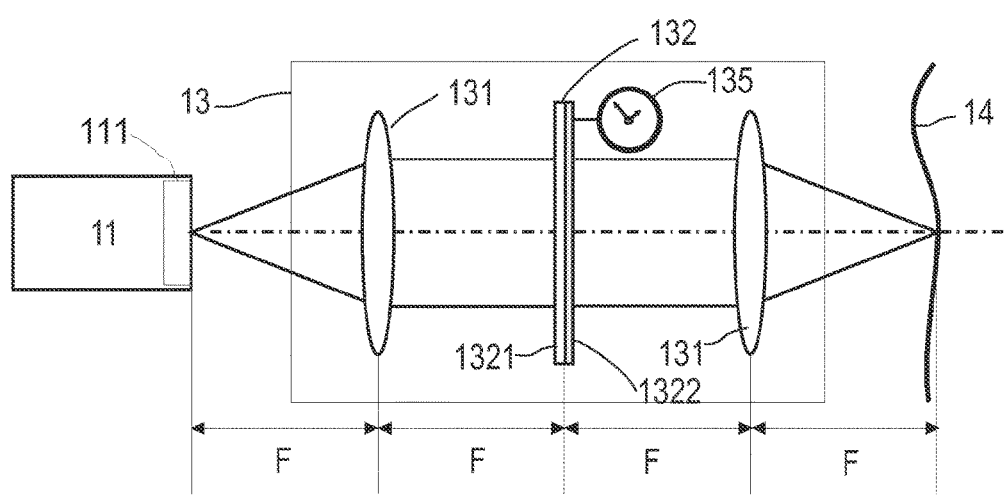
FIG. 2 Example embodiment according to the invention of a device for securing a transmission of a video image including a 4F arrangement.
Figure 3:
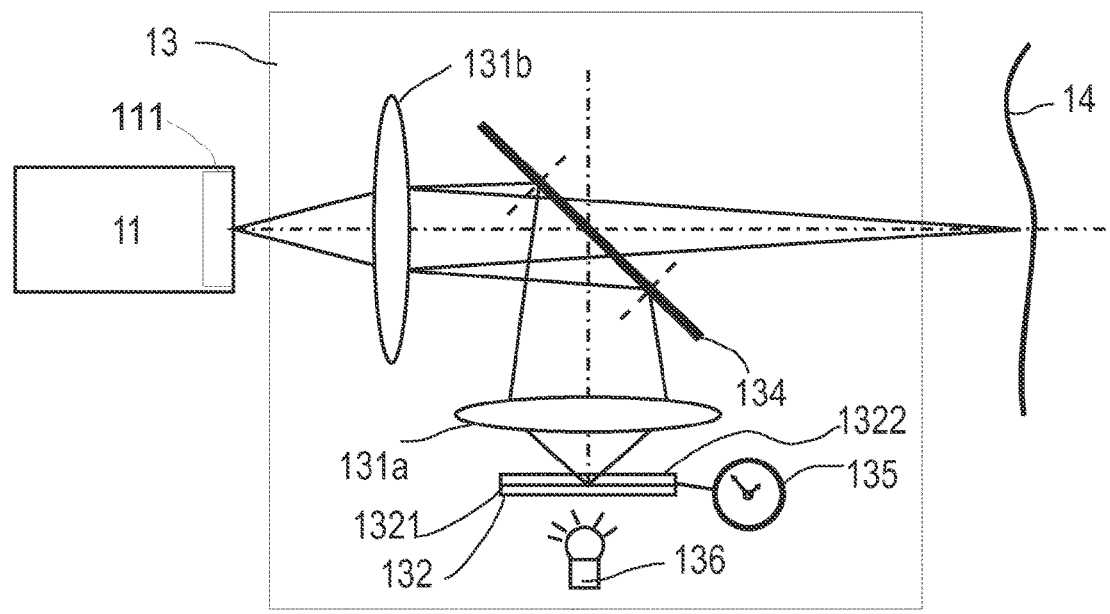
FIG. 3 Example embodiment according to the invention of a device for securing a transmission of a video image including a semi-reflective blade.
Figure 4:
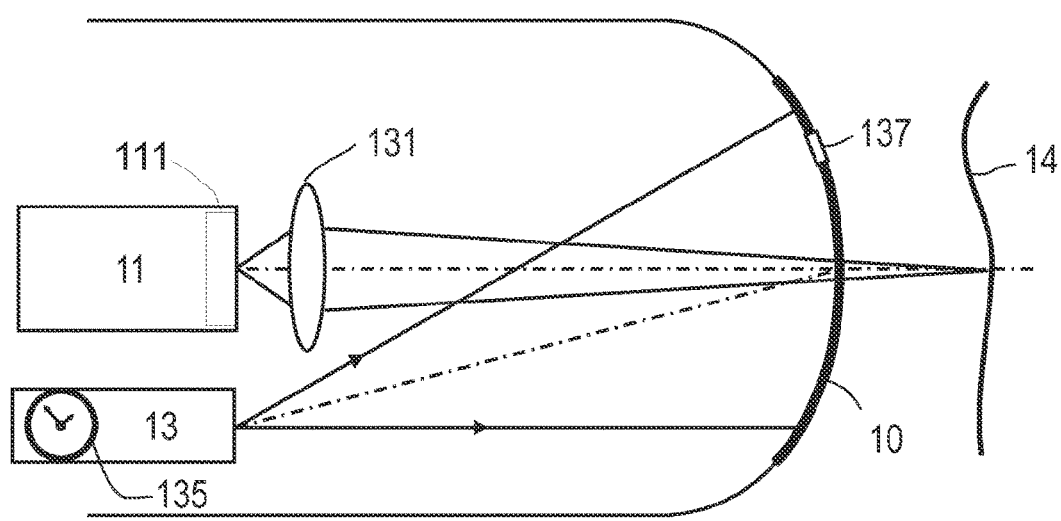
FIG. 4 Example embodiment according to the invention of a device for securing a transmission of a video image including a projection of the optical securing datum.

FIGS. 2 to 4 each show a different example embodiment of said securing device 13. In particular, the securing device 13 is able to generate, for example by radiation, an optical securing datum of the remote transmission of the image of said object 14. For this purpose, it includes in particular an optical securing data generator 132 that can generate, in particular by means of the spatial modification of light radiation, said optical securing datum. The securing device may also include an optical module, comprising optical elements such as for example at least one optical lens 131 or one semi-reflective blade 134, said optical module being able to optically superpose a securing image including said optical securing datum, onto an image of said object 14 in order to form a secure optical image intended to act on the photosensitive receiver 111 of the camera 11. Thus, the generator 132 is able to cooperate with the optical module in order to create said securing image superposable onto the image of said object. The optical module is in particular able to form said secure optical image on the photosensitive receiver 111 in order to convert said secure image into a video signal that can be generated by said photosensitive receiver 111. The video signal is then designed to be sent using the video system to a remote control station 2 where the processing means of the detection device 23 are able to reproduce the image of said object and the optical securing datum on the basis of said video signal of the secure optical image.

In particular, the detection device 23 can be coupled to a display device 22 of the video system, and/or coupled to another display device 22b intended to display the optical securing datum carried by said video signal.

FIG. 2 shows in particular an example embodiment of said securing device 13 according to the invention, based on a 4F arrangement. This example embodiment proposes modulating the intensity of the image of said object using a two-dimensional optical Fourier transform of the securing image produced by a spatial light modulator (SLM) 1321 couplable to an identification mask 1322 (intensity mask) of said generator 132. In this specific case, said generator 132 therefore includes said SLM 1321 intended to generate said optical securing datum, for example dating the image of said object, and said mask 1322 that is able to contain an identification datum of the photosensitive receiver 111. In particular, the SLM is a device able to modify the spatial components of a beam of light, for example by varying the intensity of said components. It is for example a matrix device, for example an active matrix using liquid-crystal, micromirror or organic light-emitting diode (OLED) technology, that can be controlled electrically. It enables in particular said optical securing datum to be encoded by light modulation of pixels of the matrix of said SLM. Thus, the identification datum of the photosensitive receiver and the dating of the capture of the image of said object can be encoded by the SLM in the form of at least one variation in light intensity superposable onto said image of said object. The Fourier transform is obtained by setting up a 4F assembly using two Fourier lenses 131 of focal length F arranged on either side of said generator 132, at a distance equal to the focal length of said Fourier lenses 131. In particular, the SLM can be connected to a clock 135 in order to generate said dating. Advantageously, said optical securing datum can cover the entire image of said object, given that the generator 132 is placed in a Fourier plane corresponding to the frequency domain of the image of said object. The secure optical image intended to act on the photosensitive receiver 111 is the superposition of the image of said object and of the securing image, i.e. the combination of the mask and the matrix of the SLM. The secure optical image is able to generate said video signal by interacting with the photosensitive receiver. This video signal of the secure optical image is intended to be processed by said detection device 23. In this specific case, said detection device 23 can include an optical module able to separate the securing image from said image of said object, thereby enabling said optical securing datum to be reproduced on the basis of said video signal.

FIG. 3 shows another example embodiment of the securing device 13 according to the invention, based in particular on the use of a semi-reflective blade 134. Said securing device 13 can in particular be adapted to the camera 11 of the video system, and is characterized in that it includes an optical securing data generator 132 able to generate an optical securing datum, in particular by radiation and an optical module including the semi-reflective blade 134 and at least one optical system 131a, 131b. Furthermore, said generator 132 may include a light source 136, an SLM 1321 and a clock 135.

Said optical module can in particular be coupled to said generator 132 in order to optically superpose an image of said optical securing datum, i.e. said securing image, onto an optical image of said object in order to form, by superposition, a secure optical image intended to act on the photosensitive receiver 111 of said camera 11. The photosensitive receiver 111 can therefore receive both the image of said object 14 and the securing image formed by the light rays coming from said light source 136 which may for example pass through the SLM 1321, this latter being able to display on its own matrix a securing datum intended to generate said optical securing datum by interaction with said light rays, in the manner of a slide projector. Thus, at least some of the light rays from the light source 136 pass through the generator 132, then pass through a first optical system 131a, are reflected by the semi-reflective blade 134, pass through a second optical system 131b and finally act upon the photosensitive receiver 111. Light rays coming from said object 14 pass through the semi-reflective blade 134, then the second optical system 131b in order to act upon the photosensitive receiver 111. The first optical system 131a, the second optical system 131b and the semi-reflective blade are arranged to superpose, on the photosensitive receiver 111, said securing image and said image of said object. These two images can be optically superposed at the photosensitive receiver. The SLM is in particular able to interact with the light rays of the light source 136 in order to generate said optical securing datum, including for example an identifier of the photosensitive receiver 111 and a date of the capture of the image of said object. Advantageously, the semi-reflective blade 134 enables the superposition of the securing image and of the image of said object 12.

The second optical system 131b is able to combine the image of said object with a photosensitive plane of the photosensitive receiver 111, i.e. the plane capable of interacting with the light rays in order to generate said video signal. A coupling of the first and of the second optical systems 131a, 131b make it possible to combine the matrix of the SLM (i.e. the plane of the SLM on which said optical securing datum can be displayed) with said photosensitive plane of the photosensitive receiver. In particular, the SLM can be addressed electrically in order to modify the spatial components of the light rays coming from said light source 136 and thus to generate said securing image. The SLM can then generate an identification datum of the camera and of the dating that can be encoded by a light modulation of pixels of the matrix of the SML.

The generator 132 may in particular include a physical mask 1322 specific to each camera, that is intended to filter the light rays from said light source 136 that are able to pass through the SLM matrix. In other words, the physical mask 1322 acts as a filter allowing only some of said light rays to form said securing image. In particular, by associating each photosensitive receiver to a physical mask specific to it, each camera will have a unique identification code. Thus, the selection of said part of the light rays depends uniquely on said photosensitive receiver 111 and therefore enables the determination of the photosensitive receiver that captured said secure optical image from the video signal of said secure optical image. Advantageously, a filtration of said rays by a physical mask in the SLM is moreover invariable over time, and therefore a guarantee of security. Indeed, the physical mask 1322 is both resistant to intentional and unintentional alteration and, in the event of modification, it cannot be confused with the physical mask of another camera. Thus, in the event of failure of the video system observed during processing of the optical securing datum carried by said video signal, said physical mask makes it possible to quickly determine which video system has failed and to put it into a safe state.

FIG. 4 shows an example embodiment of the securing device 13 according to the invention including a projection of the optical securing datum onto a windscreen 10 of a vehicle. In particular, the optical securing data generator includes a video projector that can be coupled to a clock 135 used to date the images captured by the photosensitive receiver 111 of the camera 11. An identification of the photosensitive receiver 111 is in particular projectable onto the windscreen 10 in order to be captured by the photosensitive receiver 111. According to another embodiment, said securing device 13 includes a two-dimensional identification code 137 that can be integrated into said windscreen 10 enabling the identification of the photosensitive receiver 111. The optical securing data generator is in particular able to generate said optical securing datum over the entire image of said object while guaranteeing display of the image of said object. In other words, the superposition of said securing image onto said image of said object enables the image of said object to be viewed correctly by an operator using a display of the secure optical image. Said securing device 13 includes in particular an optical system 131 that can combine the image of said object 14 with the photosensitive plane of the photosensitive receiver 111.

Finally, the clock 135 of said securing device 13 can be synchronized both with a clock of the camera and with a clock of said detection device 23 in order to determine the delay between the capture of an image of said object and the remote display thereof.

In summary, the method and the system for securing a transmission of the video image, as well as the securing device and the detection device according to the invention have several advantages over the existing securing methods and systems in that:

They obviate the need to design a securing system in which each subsystem is operationally safe. Indeed, the safety of the entire video system, and not each of the sub-elements comprising said video system, is validated. This principle of reproducing the video image makes it possible to avoid causes of failure in the video system. They provide an operator remotely viewing the video image of an object with optical securing data that can be used to detect a malfunction in said video image (source, recentness or integrity of the image);

They make it possible to automatically diagnose a failure of the video image of said object and to automatically trigger an alarm (visual, audible, vibrating, etc.) associated for example with the switching of a remote-control system of the vehicle into safe state. For example, an emergency braking command of a guided vehicle can be sent automatically or manually following the detection of said failure;

They also enable an error flag to be included in the display of the image of said object.

The invention claimed is:

1. A method for securing a remote transmission of an image of an object intended to be captured by a photosensitive receiver of a camera of a video system and transmitted remotely by the video system, which comprises the steps of:
    generating an optical securing datum for the remote transmission of the image of the object, the optical securing datum being generated by a first light source, the optical securing datum being different from the object;
    forming a secure optical image by optical superposition of a securing image containing the optical securing datum and of the image of the object, the image of the object being generated by a second light source being different from the first light source, the secure optical image being formed as light rays and intended to act on the photosensitive receiver of the camera in order to be converted into a video signal; and
    verifying the optical securing datum carried by the video signal.

2. The securing method according to claim 1, which further comprises forming a temporal variation of the optical securing datum.

3. The securing method according to claim 1, which further comprises forming a spatial variation of the optical securing datum.

4. The securing method according to claim 1, which further comprises forming the optical securing datum to include identification datum of the camera.

5. The securing method according to claim 1, wherein at least some of the secure optical image includes an overlay of the optical securing datum.

6. A securing device for securing a remote transmission of an image of an object to be captured by a photosensitive receiver of a camera of a video system, the securing device comprising:
    an optical securing data generator for generating an optical securing datum intended to form a securing image, said optical securing data generator outputting first light waves for generating the optical securing datum, the optical securing datum being different from the object; and
    an optical element coupled to said optical securing data generator, said optical element, optically superposing the securing image and the image of the object for forming a secure optical image intended to act on the photosensitive receiver, the image of the object being generated from second light waves coming from a light source being different from a light source generating the first light waves.

7. The securing device according to claim 6, wherein said optical securing data generator has a spatial light modulator.

8. The securing device according to claim 6, further comprising a clock that can be synchronized with a clock of a device for detecting the optical securing datum.

9. The securing device according to claim 6, wherein said optical element has a semi-reflective blade.

10. The securing device according to claim 6, wherein said optical element includes a 4F arrangement.

11. A detection device, comprising:
    a processor for processing a video signal, said processor able to detect, read and extract optical securing datum included in a video signal of a secure optical image, the secure optical image created by optical superposition of a securing image containing the optical securing datum and of the image of the object, the optical securing datum being different from the object, the optical securing datum of the secure optical image of an object being formed as light rays from two different light sources and captured by a photosensitive receiver of a camera of a video system;
    a coupler for coupling said processor to a device for remotely receiving the video signal of the video system; and
    a display for displaying the optical securing datum.

12. The detection device according to claim 11, wherein said processor is able to analyze the optical securing datum and to flag a failure of a remote transmission of data relating to the image of the object.

13. A securing system for securing a remote transmission of a video image, the securing system comprising:
    a securing device containing an optical securing data generator for generating optical securing datum intended to form a securing image, and an optical element coupled to said optical securing data generator, said optical element, optically superposing the securing image formed as first light rays and the video image of an object formed from second light rays for forming a secure optical image intended to act on a photosensitive receiver, the first and second light waves being generated by different light sources and the optical securing datum being different from the object;
    a detection device containing:
    a processor for processing a video signal, said processor able to detect, read and extract the optical securing datum included in the video signal of the secure optical image;
    a coupler for coupling said processor to a device for remotely receiving the video signal of a video system;

a display for displaying the optical securing datum; and said securing device and said detection device cooperating with each other to enable a securing of a transmission of the video image using the video system.

14. The securing system according to claim 13, wherein said securing device includes a further coupler for coupling said securing device to a camera of said video system.

15. The securing system according to claim 13, wherein said detection device includes said coupler for coupling said detection device to a receiver device of the video system.

\* \* \* \* \*